United States Patent
Meier-Arendt et al.

(10) Patent No.: US 8,274,487 B2
(45) Date of Patent: Sep. 25, 2012

(54) TOUCHPAD OR TOUCHSCREEN AND CONTROL ELEMENT FOR A TOUCHPAD OR TOUCHSCREEN

(75) Inventors: Guido Meier-Arendt, Langen (DE); Winfried Moell, Laubach (DE)

(73) Assignee: Siemens Aktiengesellschaft, Munich (DE)

( * ) Notice: Subject to any disclaimer, the term of this patent is extended or adjusted under 35 U.S.C. 154(b) by 530 days.

(21) Appl. No.: 12/382,242

(22) Filed: Mar. 11, 2009

(65) Prior Publication Data

US 2009/0237370 A1 Sep. 24, 2009

Related U.S. Application Data

(63) Continuation of application No. PCT/EP2007/059456, filed on Sep. 10, 2007.

(30) Foreign Application Priority Data

Sep. 11, 2006 (DE) .......................... 10 2006 043 208

(51) Int. Cl.
*G06F 3/041* (2006.01)
(52) U.S. Cl. .................. 345/173; 345/179; 345/184
(58) Field of Classification Search .................. 345/166, 345/173–179, 184
See application file for complete search history.

(56) References Cited

U.S. PATENT DOCUMENTS

2005/0212774 A1* 9/2005 Ho et al. .................. 345/173
2006/0007179 A1* 1/2006 Pihlaja .................... 345/173

FOREIGN PATENT DOCUMENTS

| DE | 4017897 C1 | 11/1991 |
| DE | 10305668 A1 | 3/2004 |
| DE | 10304191 A1 | 8/2004 |
| DE | 10304720 A1 | 8/2004 |
| DE | 10332614 A1 | 2/2005 |
| EP | 0618528 A1 | 10/1994 |
| JP | 9-7459 | 1/1997 |
| WO | WO 9963516 A | 12/1999 |

OTHER PUBLICATIONS

German language Japanese Office Action for related Japanese Patent Application No. 2009-527799, mailed on May 18, 2011.

* cited by examiner

*Primary Examiner* — Kimnhung Nguyen
(74) *Attorney, Agent, or Firm* — Staas & Halsey LLP

(57) ABSTRACT

A touchpad or touchscreen has a sensitive operating area for setting particular functions. To simplify operation, at least one mechanical control element is arranged above the sensitive operating area, said control element having a trigger which acts on the sensitive operating area to set functions when the control element is moved.

18 Claims, 1 Drawing Sheet

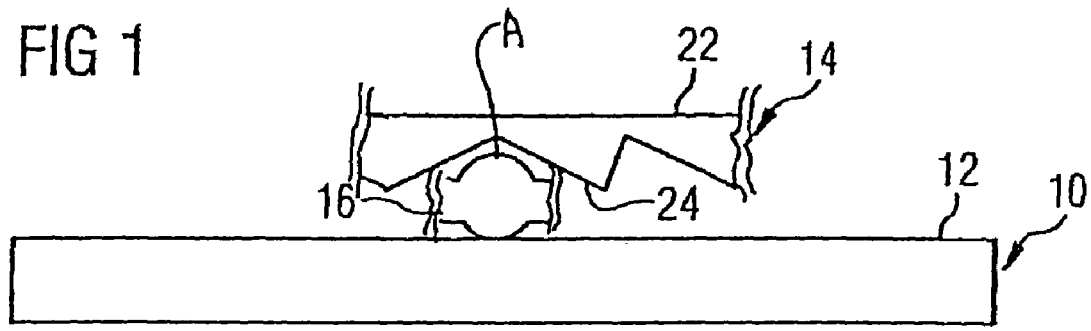
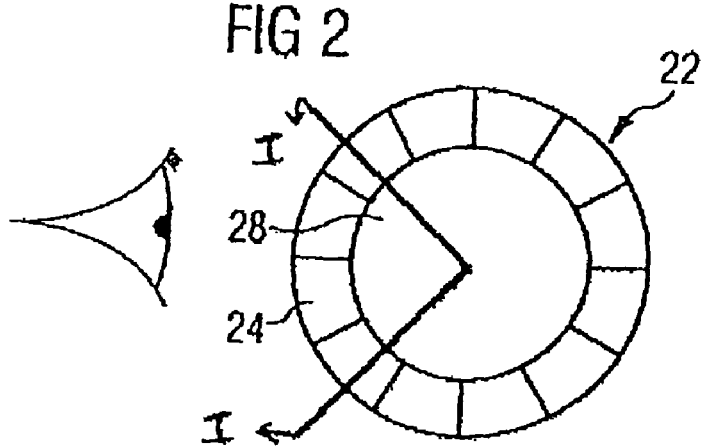
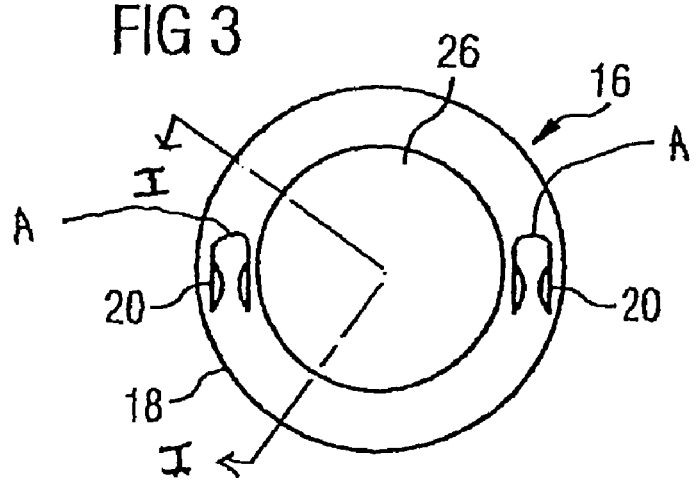

TOUCHPAD OR TOUCHSCREEN AND CONTROL ELEMENT FOR A TOUCHPAD OR TOUCHSCREEN

CROSS REFERENCE TO RELATED APPLICATIONS

This is a continuing application filed under 35 U.S.C. §111(a) of PCT Application No. PCT/EP2007/059456 filed on Sep. 10, 2007 with foreign priority benefit based upon German Application No. 10 2006 043 208.8 filed on Sep. 11, 2006. The contents these two applications are hereby incorporated by reference.

BACKGROUND OF THE INVENTION

The present invention deals with a touchpad or touchscreen with a sensitive control panel for setting particular functions, as well as a control element for a touchpad or touchscreen.

Various operator control concepts exist for the triggering and setting of particular functions, for example in motor vehicles. Classically, control elements are used in the form of rotary controls or slider controls to which particular functions are assigned, for example the temperature setting of a heater or the volume setting of an audio installation, or which are used for the control of particular menu functions. The latter takes place in combination with a display screen, it being possible for the coordination between the movement of the control element and the perception of the display screen, in particular, to become difficult if a vehicle has to be moved at the same time.

So-called touchscreens which have already been known for some considerable time have sensitive control panels, so that they are suitable for simultaneously setting and visualizing particular functions. So-called touchpads have sensitive control panels without display facilities and are usually used with a separate display screen. It is inconvenient that the key triggering does not give the user any tactile feedback and in practice only pushbutton operations are simulated. It is in fact also known that slider controls can be displayed on a touchscreen, but this requires increased concentration on the part of the user to follow a track placed in advance on the touchscreen and is therefore less suitable, especially for motor vehicles.

A rotary control with an integrated touchpad is known from DE 103 04 720 A1. The touchpad is intended to be used, in particular, to input alphanumeric characters and is provided in the central circular area of the rotary control, which is otherwise of a conventional construction. A disadvantage of this solution is the high outlay, since electrical contact with the rotary control on the one hand and the touchpad on the other is necessary, it being possible that the area on the control itself offers only limited operating options.

Moreover, a system comprising a combined output and input unit is known from DE 103 04 191 A1, it being possible in one embodiment for a conventional rotary control to be arranged centrally between two displays which can display various operating environments, for example menu levels. For its part, the stated system operates with a conventional rotary control, and it must be mentioned that in addition to the increased outlay of the electrical wiring, the special forms of the display screens can further increase the costs of such a system.

SUMMARY

One potential object relates to creating a touchpad or touchscreen which, with a simple construction, facilitates high operational security.

The inventors propose a touchpad or touchscreen of the type stated in the introduction, in which at least one mechanical control element is arranged above the sensitive control panel, the control element having an actuator which acts on the sensitive control panel to set functions when the control element is moved.

The advantage of the solution lies in the fact that, in principle, a standard touchscreen or touchpad is supplemented by a purely mechanically operating control element, which transfers its control movements via the actuator to the sensitive control panel, where the desired function is then set by the software. Since the control element acts in a purely mechanical manner, electrical wiring is eliminated and it is only necessary for the touchpad or touchscreen to be connected in the usual way. The use of a touch screen offers the advantage that the functions can be simultaneously visualized and a toolbar can be optically assigned to the control element to make operation easier.

Preferably, the at least one control element is formed from a stationary part, which is permanently arranged on the sensitive control panel, and a movable part which is movably controlled on the stationary part. In such an embodiment the control haptics can be easily influenced by modification of the control mechanism between the stationary and the movable part, for example by damping elements or latching elements.

In a particularly simple embodiment the stationary part is glued to the sensitive control panel. Very good adhesion can be achieved on the smooth control panel with the adhesive technique, it being possible in principle to actually use a standard touchpad or touchscreen.

As an alternative to a control element glued to the touchpad or touchscreen, an embodiment is also possible in which the stationary part is located on a frame at the side of the sensitive control panel, or the frame itself forms the stationary part of the control element. This variant requires suitable receptacles on the frame of the touchpad or touchscreen to lock the stationary part, for example, or a guide for the control element is formed in the frame itself. The actuator must of course always act in conjunction with the sensitive control panel.

In the non-glued embodiments it is also quite easy to embody the at least one control element so that it is detachable or able to be moved away from the surface, for example able to be hinged down or swiveled away, if for example a touchscreen is to be used for purely display purposes, in order to have the largest possible display area available when displaying a map, for example.

In principle, the control element can be embodied as known types of control elements, that is to say as a rotary control or slider control for example; it also being possible for rotary and slider controls to be used simultaneously.

The actuator can, for example, rest on the sensitive control panel as a spring-loaded sliding contact and follow the movement of the control element. The control panel would then detect the movement of the sliding contact and convert the movement to set particular functions via software. Alternatively, however, the actuator can also have a spring or hammer mechanism which executes discrete switching movements when the control element is moved. At the same time the actuator can be assigned either to the stationary part and, accordingly, act intermittently on the same point of the sensitive control panel, or move with the moving part and, accordingly, execute a sequence of switching movements on the controlled track.

For example, the spring or hammer mechanism can have an inclined area or a sequence of inclined areas which, when the control element is moved, move a spring element against the control panel. The inclined areas can be arranged for example as a sawtooth contour on the movable part of the control element, whereas the spring element is arranged on the stationary part in order to actuate a switching movement at one point on the control panel, while in the case of a moved actuator the arrangement should be the other way round.

In the case of a touchscreen, it is preferred if this is subdivided into a display panel for displaying function-related data, and an operator control panel in which the at least one control element is arranged and symbols are displayed if required. As already mentioned, in the case of a removable control element, if necessary the operator control panel can also be used as a display panel.

As likewise already mentioned, symbols that are matched to the respective function, for example a temperature display or a decibel display for the volume control, are preferably assigned to the control element when a touchscreen is used. Preferably, a separate display panel to display the function-related data is assigned to the control element. Preferably, optical fiber elements are provided which display a representation of the touchscreen on the display panel. With the aid of color filters and/or lens elements the optical fiber elements can vary the colors of and/or increase or reduce the size of the representation of the touchscreen on the display panel in order to clearly contrast this with the other display.

As already mentioned, the operating haptics of the control element can be influenced by the configuration of the control between the movable part and the stationary part. The sliding forces and torsional forces can be influenced to a large extent with the aid of an electromagnet arranged beneath the sensitive surface, the magnet acting in conjunction with magnetically-acting elements on the movable part of the control element to vary the operating characteristic.

The subject matter is also a control element for a touchscreen in order to obtain with a standard touchscreen the advantages of the combination of touchscreen and control element described above. For this, a control element is provided which has a stationary part which can be located on the touchscreen, a movable part with which control movements can be set for a function, and an actuator that is assigned to the stationary part or the movable part, it being possible, after fitting, for the actuator to act discretely or continuously on the sensitive control panel. Such a control element can be embodied as a rotary control or a slider control and, with an especially simple embodiment, the stationary part can be provided with a smooth surface for the application of adhesive in order to attach the control element to the control panel in a simple manner.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a side view of corner section of a rotary control, which rotary control is mounted on a sensitive surface;

FIG. 2 shows a schematic view, from below, of the movable operating device of the rotary control of FIG. 1, and FIG. 3 shows a schematic top view of a fixed part of the rotary control in FIG. 1.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

A touchscreen 10 with a rotary control 14 mounted on its sensitive surface 12 is shown schematically in FIG. 1. The rotary control 14 has a fixed lower part 16 that is formed as a flat annular body 18 (see FIG. 3) with two spring tabs 20, for example. The flat annular body 18 is glued directly to the surface 12 of the touchpad or touchscreen. The touchscreen includes a display element. The touchpad has a contact-sensitive surface, but no display screen.

The side view of FIG. 1 is taken through the sectional line 1-1 shown in FIGS. 2 and 3. If FIG. 1 was instead a side view of the entire operating device 22, then the sawtooth structure would continue to the right of FIG. 1. In addition, a back portion of the sawtooth structure would be visible if FIG. 1 was taken as a side view of the entire operating device 22. Specifically, additional angular structures would be visible between the teeth shown in FIG. 1 in order to represent the sawtooth structure 24 on the other side of the rings.

An operating device 22 that is embodied with an annular sawtooth structure 24 on its underside is supported in a rotatable manner on the fixed part 16. During rotation of the rotary operating device 22, the sawtooth structure acts in conjunction with the spring tabs 20 in such a way that the sawtooth structure presses these spring tabs against the sensitive surface 12 of the touchscreen, it being possible that excessively high forces are avoided by the elasticity of the spring tabs 20. In the area of the pressure point of the spring tab 20 the touchscreen 10 is programmed so that a particular function is triggered by the pressure. The continuing rotation of the operating device 22 therefore results in a discrete sequence of switching operations triggered by the spring tabs 20. Reference letter A in FIG. 1 corresponds with reference letter A in FIG. 3. As the operating device 22 is rotated, the spring tabs 20 are moved toward and away from the sensitive surface 12 with each indentation of the sawtooth structure 24.

A scale assigned to the rotary control 14 can be displayed around the latter on the surface of the touchscreen 10. In the demonstrated embodiment, the fixed part 16 has a transparent region 26 which shows visibly a representation of the touchscreen 10 on a display area 28 in the central area of the rotary control 14. Such a representation can be further optically highlighted by lenses, fiber-optic conductors and/or color filters, so that the display in this area is clearly emphasized with respect to other displays on the surface of the display screen 12, for example.

The controlled movement of the operating device 22 generates tactile support and thus simplifies the co-ordination process between eye and hand, so that during operation in a motor vehicle, for example, the user can turn his attention back to the traffic situation as soon as he has located the rotary control with his hand.

The demonstrated exemplary embodiment represents a particularly simple rotary control 14 which, in addition to the controlled rotary movement, also conveys to the user a defined click-stop type of action by which the user receives feedback regarding the change in the setting of the respective function. However, other embodiments are also possible in which a click-stop action is dispensed with, for example, by providing on the movable operating device 22 a spring tab held under spring pressure against the surface of the touchscreen. Naturally a discretely triggered spring tab can also be provided on the movable operating device 22, it then being possible for the sawtooth structure to be correspondingly embodied on the fixed part.

Other trigger mechanisms can also be used, for example spring elements which are preloaded like a clapper and then, in order to trigger a switching operation, briefly impact the surface of the touchscreen. The control forces can be dynamically influenced by an electromagnet beneath the display screen, for example, the electromagnet acting in conjunction with a magnetic element assigned to the rotatable element.

The operation of a touchscreen can of course be improved in a similar way by a slider control whose construction is similar to that of the rotary control described above.

Alternatively, the attachment to the touchscreen can also be achieved by mounting a control element, for example in the form of the rotary control described above, to a frame at the side of the sensitive control panel 12, for example by a latching arrangement. In this case it is also possible to attach the control of the movable operating device itself to the frame, it then being possible to provide suitable constructional measures in this area.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

What is claimed is:

1. A touchpad or touchscreen, comprising:
    a sensitive control panel to control functions of a device when a surface of display screen is touched by a user; and
    a mechanical control element arranged above the sensitive control panel, the control element having an actuator which acts on the sensitive control panel to control functions of the device when the control element is moved,
    wherein the control element has a stationary part permanently mounted in relation to the sensitive control panel, and a movable part which is controlled by the user in a movable manner on the stationary part, the actuator being part of the stationary part.

2. The touchpad or touchscreen as claimed in claim 1, wherein the stationary part is glued to the sensitive control panel.

3. The touchpad or touchscreen as claimed in claim 1, wherein the stationary part is attached to a side of the sensitive control panel with a frame, or the frame itself forms the stationary part of the control element.

4. The touchpad or touchscreen as claimed in claim 3, wherein the control element can be detached or moved away from the control panel.

5. The touchpad or touchscreen as claimed in claim 1, wherein the control element is a rotary control element rotated by the user.

6. The touchpad or touchscreen as claimed in claim 1, wherein the control element is a slider control element slid by the user.

7. The touchpad or touchscreen as claimed in claim 1, wherein the actuator rests on the sensitive control panel as a spring-loaded sliding contact and follows the movement of the control element.

8. The touchpad or touchscreen as claimed in claim 1, wherein the actuator has a spring mechanism or hammer mechanism which executes discrete switching movements when the control element is moved.

9. The touchpad or touchscreen as claimed in claim 8, wherein the spring mechanism or hammer mechanism has an inclined area or a sequence of inclined areas which, when the control element is moved, move a spring element against the sensitive control panel.

10. The touchpad or touchscreen as claimed in claim 9, wherein the inclined areas are arranged as a sawtooth contour on the movable part of the control element and the at least one spring element is arranged on the stationary part.

11. The touchscreen as claimed in claim 1, wherein
    the sensitive control panel is a sensitive display screen, and
    the sensitive display screen is sub-divided into a display panel for displaying function-related data, and a control panel in which the at least one control element is arranged.

12. The touchscreen as claimed in claim 1 wherein a separate display panel which displays function-related data is provided on the control element.

13. The touchscreen as claimed in claim 12, wherein
    the sensitive control panel is a sensitive display screen, and
    at least one optical fiber element displays a representation of the sensitive display screen on the display panel.

14. The touchscreen according to claim 13, wherein the at least one optical fiber element has lens elements, optical fiber conductors and/or color filters which vary the colors of and/or increase or reduce the size of the representation.

15. The touchpad or touchscreen as claimed in claim 1, wherein an electromagnet is provided beneath the sensitive display panel, said electromagnet acting in conjunction with a magnetic element assigned to the control element to vary the operating characteristic.

16. A control element for a touch pad or a touchscreen having a sensitive control panel, comprising:
    a stationary part which is attachable to the sensitive control panel;
    a movable part with which a user can execute control movements to control a function of a device; and
    an actuator that is part of the stationary part, for discrete or continuous action on the sensitive control panel.

17. The control element as claimed in claim 16, wherein the movable part is a rotary control element or a slider control element.

18. The control element as claimed in claim 16, wherein the stationary part has a smooth surface for the application of adhesive.

* * * * *